(12) United States Patent
Serlet et al.

(10) Patent No.: US 8,244,712 B2
(45) Date of Patent: Aug. 14, 2012

(54) LOCALIZED VIEWING OF FILE SYSTEM NAMES

(75) Inventors: Bertrand Serlet, Palo Alto, CA (US); Ali Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1053 days.

(21) Appl. No.: 10/389,743

(22) Filed: Mar. 18, 2003

(65) Prior Publication Data

US 2004/0186857 A1    Sep. 23, 2004

(51) Int. Cl.
  *G06F 7/00* (2006.01)
(52) U.S. Cl. ........................................ 707/713
(58) Field of Classification Search ................ 707/206, 707/200, 100, 103, 104.1, 10, 687, 705, 713
  See application file for complete search history.

(56) References Cited

U.S. PATENT DOCUMENTS

| | | | |
|---|---|---|---|
| 5,613,122 A | 3/1997 | Burnard et al. | |
| 5,652,884 A * | 7/1997 | Palevich | 713/1 |
| 5,717,877 A * | 2/1998 | Orton et al. | 715/860 |
| 5,940,841 A * | 8/1999 | Schmuck et al. | 707/205 |
| 6,035,303 A * | 3/2000 | Baer et al. | 1/1 |
| 6,606,632 B1 * | 8/2003 | Saulpaugh et al. | 1/1 |
| 6,623,529 B1 * | 9/2003 | Lakritz | 715/205 |
| 6,718,331 B2 * | 4/2004 | Davis et al. | 1/1 |
| 6,766,324 B2 * | 7/2004 | Carlson et al. | 1/1 |
| 6,789,094 B2 * | 9/2004 | Rudoff et al. | 707/200 |
| 6,839,742 B1 * | 1/2005 | Dyer et al. | 709/217 |
| 6,871,346 B1 * | 3/2005 | Kumbalimutt et al. | 718/104 |
| 6,956,845 B2 * | 10/2005 | Baker et al. | 370/352 |
| 6,976,090 B2 * | 12/2005 | Ben-Shaul et al. | 709/246 |
| 7,013,289 B2 * | 3/2006 | Horn et al. | 705/14.51 |
| 7,092,950 B2 * | 8/2006 | Wong et al. | 1/1 |
| 7,149,964 B1 * | 12/2006 | Cottrille et al. | 715/234 |
| 7,165,073 B2 * | 1/2007 | Vandersluis | 1/1 |
| 7,194,413 B2 * | 3/2007 | Mahoney et al. | 704/277 |
| 7,441,184 B2 * | 10/2008 | Frerebeau et al. | 715/234 |
| 2002/0010798 A1 * | 1/2002 | Ben-Shaul et al. | 709/247 |
| 2002/0078041 A1 * | 6/2002 | Wu | 707/4 |
| 2003/0115186 A1 * | 6/2003 | Wilkinson et al. | 707/3 |
| 2003/0126559 A1 * | 7/2003 | Fuhrmann | 715/513 |
| 2003/0149567 A1 * | 8/2003 | Schmitz et al. | 704/270 |

FOREIGN PATENT DOCUMENTS

EP    1 233 600 A    8/2002

* cited by examiner

*Primary Examiner* — Hosain Alam
*Assistant Examiner* — Eliyah S Harper
(74) *Attorney, Agent, or Firm* — Buchanan Ingersoll & Rooney PC (57) ABSTRACT

The elements of a file system contain information that provides language-specific views of the file system. An indicator in each element enables a quick determination to be made whether that element is localized. These indicators can take the form of a key-value pair in a properties list, a special file in the element, such as an empty file, or a special extension on the name of the file. If the element is localized, the localization information can be stored as part of the element, or in a central location for use with multiple different elements. A library of APIs associated with the file system performs methods to determine whether a requested file system element is localized, and to retrieve the localized name in that case.

26 Claims, 3 Drawing Sheets

LOCALIZED VIEWING OF FILE SYSTEM NAMES

FIELD OF THE INVENTION

The present invention is directed to operating systems for computers, and more particularly to the localization of elements stored in a computer's file system, to enable different users to view the elements in a language of their choice.

BACKGROUND OF THE INVENTION

Many popular computer programs are designed to be used in a variety of different countries. When a program is to be used in a given country, it is desirable for the user to be able to interact with the program by means of the user's native language. Thus, for example, an American user would expect to see interface components such as menu commands, dialogue boxes and warnings presented in the English language, whereas a French user would prefer to have these same components appear in the French language. One manner in which this objective can be accomplished is to develop a separate version of the program in each language. However, this approach presents an unnecessary duplication of development effort, and is prone to error, since each different version of the program needs to be tested and debugged.

To avoid the need for multiple versions of a program in different languages, the concept of internationalization has been incorporated into program development. An internationalized program is based upon a core block of executable code that is independent of language, and that supports localization of language-related features. Localization is the adaptation of a software product for use in multiple regions of the world. Localization of software can include translating user-interface text, resizing text-related graphical elements, and modifying images and sound to conform to local conventions.

The present invention is particularly concerned with the localization of computer operating systems. Popular operating systems, such as the Mac OS® developed by Apple Computer, Inc. and Microsoft Windows® developed by Microsoft Corporation, support localization to varying degrees. For example, during the initial installation of an operating system, the user is typically provided with the opportunity to designate the language in which textual components of the user interface will appear. The user may also have the opportunity to select other regional settings, which may determine the formatting for currency, date and time, and the like. After installation, the user may also be able to switch among different preferred languages.

In the past, when the user selected a language other than the default language in which the program was developed, certain elements of the user interface, such as menu bars and warning labels, would change to the selected language. However, file system elements, such as folder names and directory names, were not supported by this change. This limitation was due to the fact that elements of the file system, such as files and folders, are stored in their original language at the file system layer of the operating system. There are a number of different ways in which a user can access this layer to view files stored in the file system. One way is by means of a desktop manager, such as the Finder in the Mac OS, or a browser, such as Explorer in the Microsoft Windows operating system. Another way to look at files is by means of an "Open" panel that is typically provided within the context of an application program. A third way to look at files is through a "Find" or "Search" utility. As a further complicating factor, the same files stored on a central server may be simultaneously viewed by different users who have designated respectively different preferred languages. These various concerns made it difficult to support localization of file system elements in a manner that can accommodate all of the various ways to look at files. Consequently, the traditional approach has been to have a different file system for each language to be supported. As noted above, such duplication is undesirable for a number of reasons.

Accordingly, it is an objective of the present invention to provide localized views of file systems that enable multiple simultaneous localizations of a file to take place and that minimizes the impact on performance of the computer operating system. It is further desirable to provide these features in a manner which readily facilitates the ability of program developers to localize their products in a manner supported by the operating system.

SUMMARY OF THE INVENTION

In accordance with the present invention, the elements of a file system contain information that provides language-specific views of the file system. In one embodiment of the invention, this result is achieved by incorporating an indicator in each element that enables a quick determination to be made whether that element is localized. In accordance with disclosed embodiments of the invention, these indicators can take the form of a key-value pair in a properties list, a special file in the element, such as an empty file, or a special extension on the name of the file. If the element is localized, the localization information can be stored as part of the element, or in a central location for use with multiple different elements. A library of APIs associated with the file system performs methods to determine whether a requested file system element is localized, and to retrieve the localized name in that case.

Among the advantages provided by the invention is the fact that, since all of the functionality for localizing file system names resides within the file system itself, existing applications do not need to be revised to take advantage of this functionality. Furthermore, the actual names of the files themselves are not changed; only the user's view of those names is affected. As a result, the techniques of the present invention can be applied to any type of file system to provide localization capabilities.

In a further embodiment of the invention, files containing localization information can be renamed in accordance with the localized name of an element, to enable quick searching of elements based on their localized names.

Further features of the invention, and the advantages provided thereby, are described hereinafter with reference to exemplary embodiments and to the accompanying figures.

DETAILED DESCRIPTION

To facilitate an understanding of the present invention, it is described hereinafter with reference to its implementation in an operating system for personal computers. Further in this regard, specific references are occasionally made to structures and formats associated with the Mac OS, to provide the reader with specific examples of the concepts which underlie the invention. It will be appreciated, however, that the invention is not limited to these illustrative examples. Rather, the principles upon which the invention is based can be applied to a variety of different types of computer operating systems, as will be apparent to those of skill in the art.

Figure 1:
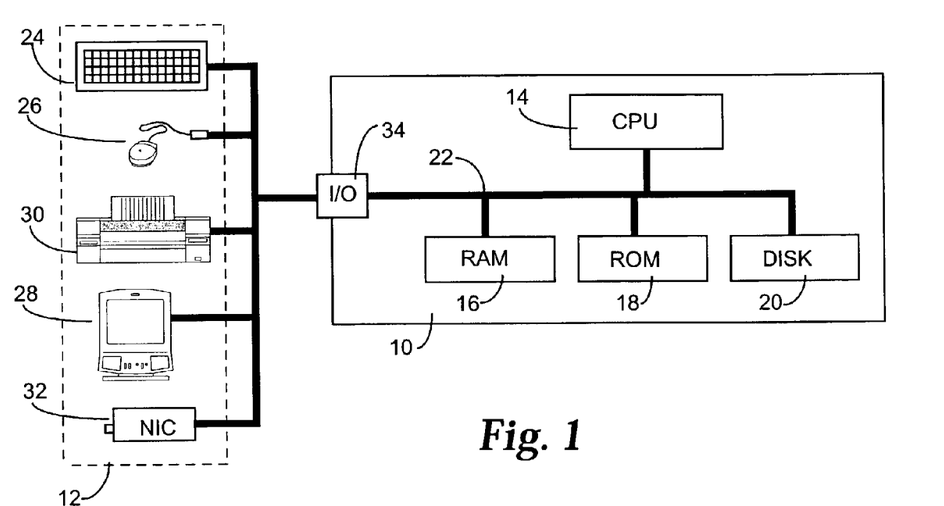
FIG. 1 is a general block diagram of an exemplary computer system in which the present invention can be implemented.

An exemplary computer system, of the type in which the present invention can be implemented, is illustrated in block diagram form in FIG. 1. The exemplary computer system includes a computer 10 having a variety of external peripheral devices 12 connected thereto. The computer 10 includes at least one central processing unit 14 and associated memory. This memory generally includes a main memory which is typically implemented in the form of random access memory 16, a static memory that can comprise a read-only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26, such as a mouse, trackball, pen or the like. One or more display devices 28, such as a CRT monitor or an LCD screen, provides a visual display of information, including the various components of a graphical user interface. Hard copies of desired information can be provided through a printer 30, or similar such device. A network connection 32 provides the computer with access to one or more servers, which may function as gateways, file storage systems, messaging systems, and the like. Each of these external peripheral devices 12 communicates with the CPU 14 by means of one or more input/output ports 34 on the computer.

Figure 2:
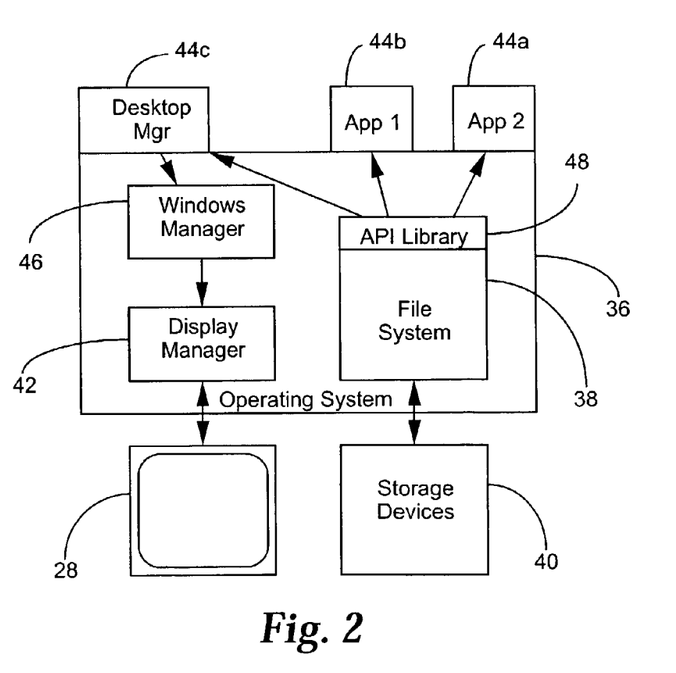
FIG. 2 is a block diagram of the architecture of some of the software and hardware components of the computer system.

The CPU 14 executes software programs that are retrieved from the permanent storage device 20 or remotely accessible storage devices, and loaded into its working memory 16. The principle software components that are involved in the implementation of the present invention are depicted in the block diagram of FIG. 2. The computer's operating system 36 performs basic low-level functions and interacts with the hardware components of the computer system. As illustrated in FIG. 2, the operating system includes a file system 38 that is responsible for managing the reading and writing of data on storage devices 40 that are mounted on the computer system, such as the permanent memory 20 and/or remote file servers. The file system is also responsible for the logical organization of the files stored on the devices 40, and the presentation of information regarding those files to the user. Another component of the operating system 36 is a display manager 42, which controls the information that is presented to the monitor 28 for display to the user.

In addition to the operating system, one or more application programs 44 are executed by the CPU 14, to enable the user to perform various tasks, such as word processing, drawing, Internet browsing, and the like. Included among the application programs is a desktop manager 44c, which controls the presentation of information on the desktop, or primary window, of the user interface. For example, the desktop manager controls the display of folders, files and icons on the desktop, and the opening of their contents into windows. An example of such a desktop manager is the Finder component of the Mac OS. Each of the application programs 44 interact with a windows manager 46 that also forms part of the operating system 36. The windows manager controls the location and appearance of various user interface elements, as well as the contents of windows. This information is presented to the display manager 42, for presentation on the monitor 28.

The application programs 44 interact with the file system 38 to obtain information about files, folders, directories, and the like, that are stored in the storage devices. For example, if a user enters an "Open" command in one of the applications 44a or 44b, the application communicates with the file system 38 to obtain a list of files and folders that are available to be opened. This list is then presented to the user within a window associated with the application program. The desktop manager 44c communicates with the file system 38 to obtain information regarding files and folders that the user has indicated should be displayed on the desktop. Based upon this information, the desktop manager controls the manner in which icons and labels pertaining to those files and folders are displayed, via the windows manager 46 and the display manager 42.

In addition to applications, other types of software may interact with the file system 38 to access or otherwise obtain information about elements stored on the storage devices 40. For instance, some types of plug-in programs may need to access the files on the storage devices 40. In addition, utility programs such as a search tool, which may be part of the operating system or provided by a third party, obtain information about files stored on the storage devices, via the file system 38.

Each file and folder that is stored on the storage devices 40 has a number of attributes associated with it. Two of these attributes include an icon that is to be used to represent the file or folder, and a name that is to be displayed. The icon may be explicitly specified as one of the attributes stored with the file, or it may be derived from other information regarding the file, such as an extension. Typically, the name of the file is explicitly stored as one of its attributes. These items of information, i.e., the name and icon to be displayed, are derived from the attribute data by means of a set of application programming interfaces (APIs) contained in a library 48 associated with the file system. In essence, the library retrieves attribute data stored with each file in the storage devices 40, and presents the appropriate corresponding information, such as the name or icon identification, to the application program 44 or other software that requested information regarding the file.

The present invention provides localization of the names that are displayed for elements stored within the file system, namely files and folders (or directories). This functionality is accomplished through APIs contained within the library 48. In accordance with the invention, different types of elements support localization in different ways, to provide various efficiencies. In one implementation of the invention, file system elements are divided into three different types, for purposes of localization. These three types comprise bundles, special folders, and arbitrary folders and files.

A bundle is a directory in the file system that stores executable code and/or software resources related to the code. In essence, a bundle directory comprises a collection of a set of resources in a discrete package. The resources can include items such as images, sounds and localized character strings that are used by the software. Bundles are typically used for applications, frameworks and other types of loadable packages, such as plug-ins.

An exemplary bundle for an application may have the following layout:

```
Bundle1.app/
   Contents/
      App1 (executable code)
      Helper Tool
      Info.plist (contains "BundleDisplayName"="Bundle1")
      Resources/
         Bundle1.icns
         Image1.tiff
         Image2.tiff
         Sounds/
```

In this example, the bundle includes a contents directory, which contains the executable code for the application and a helper tool, an information properties list, and a resources directory. The resources in this particular case include a set of icons, two image files, and a directory for sounds. The information property list contains key-value pairs that may be stored in XML format, for example. These pairs specify attributes such as the name of the main executable for the bundle, version information, type and creator codes, and other metadata. One of these keys is named "BundleDisplayName", and its value is the original name given to the bundle at its creation, i.e., "Bundle1" in this example.

Typically, a bundle directory is displayed to users as a single file, to avoid unwarranted tampering with the bundle's contents. If desired, however, the directory structure of certain types of bundles, such as frameworks, need not be hidden. Whether a bundle is displayed as a file or a folder can be determined by means of an attribute that is set in the bundle directory and stored in the information properties list.

For purposes of localization, multiple sets of resources can be contained within a bundle, with each set corresponding to a particular language, locale and/or platform. To illustrate the manner in which different types of elements of a file system are localized in accordance with the present invention, an example will be described hereinafter in which an element is localized for each of the English and French languages. The default, or non-localized, name for the element will be designated as "Hello". The English localized name is "Hi" and the French localized name is "Bonjour". An application bundle, according to this example, would have the following format:

```
Hello.app/
    Contents/
        App1
        Helper Tool
        Info.plist (contains "BundleDisplayName" = "Hello")
        Resources/
            Image1.tiff
            en.lproj/
                Image2.tiff
                InfoPlist.strings (contains "BundleDisplayName" = "Hi")
            fr.lproj/
                Image2.tiff
                InfoPlist.strings (contains "BundleDisplayName" =
                    "Bonjour")
            Sounds/
```

In the bundle, the Info.plist file contains a key-value pair (among others) that identifies the non-localized, or default, name to be displayed for the bundle. The Resources directory contains two subdirectories that respectively pertain to English language localization (en.lproj) and French language localization (fr.lproj). In this particular example, Image 1 is language-independent, and therefore is located outside of these two subdirectories. However, Image 2 is assumed to contain text. Therefore, different versions of this image are respectively placed in the two subdirectories. In addition, each directory contains a localized resource file named "InfoPlist.strings" that is associated with the information properties list file Info.plist. The InfoPlist.strings resource file in each subdirectory contains the localized name of the bundle for its associated language, among other key-value pairs.

In operation, when the "Hello" bundle is to be displayed, one of the APIs in the library 48 examines the resources in the bundle to determine whether it contains a subdirectory for the user's preferred language. If so, the API examines the InfoPlist. strings file in that subdirectory to determine whether it contains a "BundleDisplayName" key. If so, the value associated with that key is provided to the requesting application or utility, to be displayed as the name for the bundle. If the bundle does not contain a subdirectory associated with the preferred language, or if the subdirectory exists but it does not contain a "BundleDisplayName" key, the API retrieves the default name from the Info.Plist file, and provides it to the requesting application.

In an alternative embodiment of the invention, the determination whether to display a localized name can be made more efficient by including another key-value pair in the Info.plist file which indicates whether the bundle has a localized display name. For example, the key might be named "Localized". If the bundle does not have any localization resources, the value of this key can be set to false. If, however, localization information is contained among the resources, the value of this key can be set to true. In this embodiment, the API first checks the value of this key in the Info.plist. If it is false, the API need look no further, and simply provide the default name for the bundle.

The foregoing example has been provided with reference to application bundles. It will be appreciated that the same approach can be employed for any other type of file system element in which attribute data and resources are contained within that element. The APIs in the library 48 that deal with localization can be published so that developers can include the appropriate resources to support localization in desired languages. Thus, whenever a developer creates a new application, plug-in, or other similar type of loadable code that lends itself to packaging in a bundle, the developer can include all of the appropriate localization information with the bundle. If support for additional languages is desirable, a subdirectory of data appropriate to that language can be easily added to the resources for the bundle at any time. Thus, for example, if a third party later develops Japanese-language support for the application, a Japanese language project folder can be copied into the Resources directory of the bundle.

Another category of file system elements to be localized comprises pre-established folders. Basically, this category is made up of folders that are provided with the basic operating system. For example, the Mac OS includes a number of pre-defined folders such as "System," "Library," "Applications," "Documents," "Pictures," etc. In one implementation of the invention, separate language project subdirectories can be incorporated in each of these pre-defined folders, in the same manner as described previously with respect to bundles. However, in such a case, much of the same information may be replicated in each folder. In accordance with another embodiment of the invention, therefore, all of the localization information is collected in a central location, where it is accessed whenever any of the pre-established folders is to be displayed. In this case, each of the pre-established folders contains a single hidden file to indicate that the folder is localized. The following example illustrates this implementation:

```
Pictures/
    .localized
/System/Library/Services/FolderLocalizations/
    en.lproj/
        FolderLocalization.strings (contains "System"="...";
        "Pictures"="...", etc.)
```

```
fr.lproj/
    FolderLocalization.strings (contains "System"="..."; 
        "Pictures"="...", etc.)
```

In this example, the "Pictures" folder contains an empty file named ".localized". This file is preferably a hidden file, so that it is not displayed to the user. The presence of this file provides an indication that the "Pictures" folder has localization information associated with it. This localization information is stored at a central location, which in this example is identified by the path "/System/Library/Services/FolderLocalizations/". Within this directory are contained two subdirectories respectively associated with the English and French languages. Each subdirectory contains a strings file of the localized names for the special folders.

This approach enables a quick first-pass test to be conducted to determine if a particular folder name is localized. An API in the library 48 first checks the folder of interest, to see if it contains the ".localized" file. If not, there is no localization, and the normal process is carried out for displaying the folder's name. If the ".localized" file is present, the API then checks the "Folder Localizations" directory to see if a subdirectory associated with the user's preferred language is present. If so, the API checks that subdirectory's strings file, to see if it contains a key that matches the name of the folder, e.g. "Pictures". If such a key is found, the value associated with that key is the localized name for the folder. This value is retrieved from the strings file in the subdirectory and provided to the requesting application as the name of the folder.

Of course, the localized name can be stored within the contents of the special folder itself, rather than a central location, if desired. For instance, instead of being an empty file, the "localized" file could contain the localized names of the folder.

Arbitrary folders that might be added at any time by the developer of the operating system, or third parties, represent another category of file system elements that can be localized. These folders may not have the same format as a bundle, and therefore may not include the resources that are used for localization in the examples described above. In this case, a pre-defined extension can be used to indicate that a folder name should be localized when it is displayed. The following example illustrates one manner in which an arbitrary folder can be localized according to this aspect of the invention:

```
Hello.localized/
    localized/
        en.strings (contains "Hello" = "Hi")
        fr.strings (contains "Hello" = "Bonjour")
```

In this example, the "Hello" folder is given the extension "localized" to indicate that the folder's name should be localized upon display. Preferably, this extension is hidden from the user's view. In addition, the folder contains a hidden directory named ".localized". This directory contains string files that respectively pertain to the different languages being supported.

In operation, an appropriate API in the library 48 determines whether a folder to be displayed includes the ".localized" extension. If so, the API then checks for the existence of a string file pertaining to the user's preferred language. If the file exists, it is examined to determine whether it contains a key that matches the name of the folder. If it does, the localized name appearing as the value for that key is substituted for the default folder name, and provided to the requesting application, for display to the user.

This same approach can be used for individual files, as well as folders. In this case, the file is given the hidden extension ".localized", and a hidden file is associated with the principal file. This hidden file contains the localization information for the principal file, i.e. the strings for each supported language.

Many operating systems permit the user to change the names of files and folders. When this occurs, it is logical to assume that the user would prefer to see the file or folder displayed with the new name that has been given to it by the user, even if there is a localized name available for the user's preferred language. To accommodate this behavior, the localized name of an arbitrary folder is displayed only if the actual file name (as stored in the file system) matches a key in the appropriate strings file.

To illustrate, in the foregoing example, the actual folder name is "Hello". In this case, if the user's preferred language is English, that folder will be displayed with the name "Hi", and if French is the preferred language the folder will appear with the name "Bonjour." To personalize the display, the user may change the name of the folder, for example to "Howdy." In this case, the format of the folder would appear as follows:

```
Howdy.localized/
    .localized/
        en.strings (contains "Hello" = "Hi")
        fr.strings (contains "Hello" = "Bonjour")
```

When the folder is to be displayed, the actual name "Howdy" does not correspond to the keys in any of the strings files. Thus, the file name is displayed as "Howdy", even if the user's preferred language is English or French. If the user should subsequently change the name back to the original name, localizations will be restored, since the actual name again matches the keys in the strings files.

This same behavior can be exhibited by the other categories of elements described in the previous examples. For instance, in the case of bundles, a localized name is retrieved and displayed only if the actual name of the bundle matches the BundleDisplayName entry in the Info.plist file. In the case of special folders, if the user changes the original name of the folder, there would be no corresponding key for the changed name in the central directory. For instance, if the user changed the name of a file from "Pictures" to "Photos", there is no key in the central directory having the name "Photos" that would cause a language-based change in the view, and hence the displayed name of the file would remain "Photos".

Figure 3:
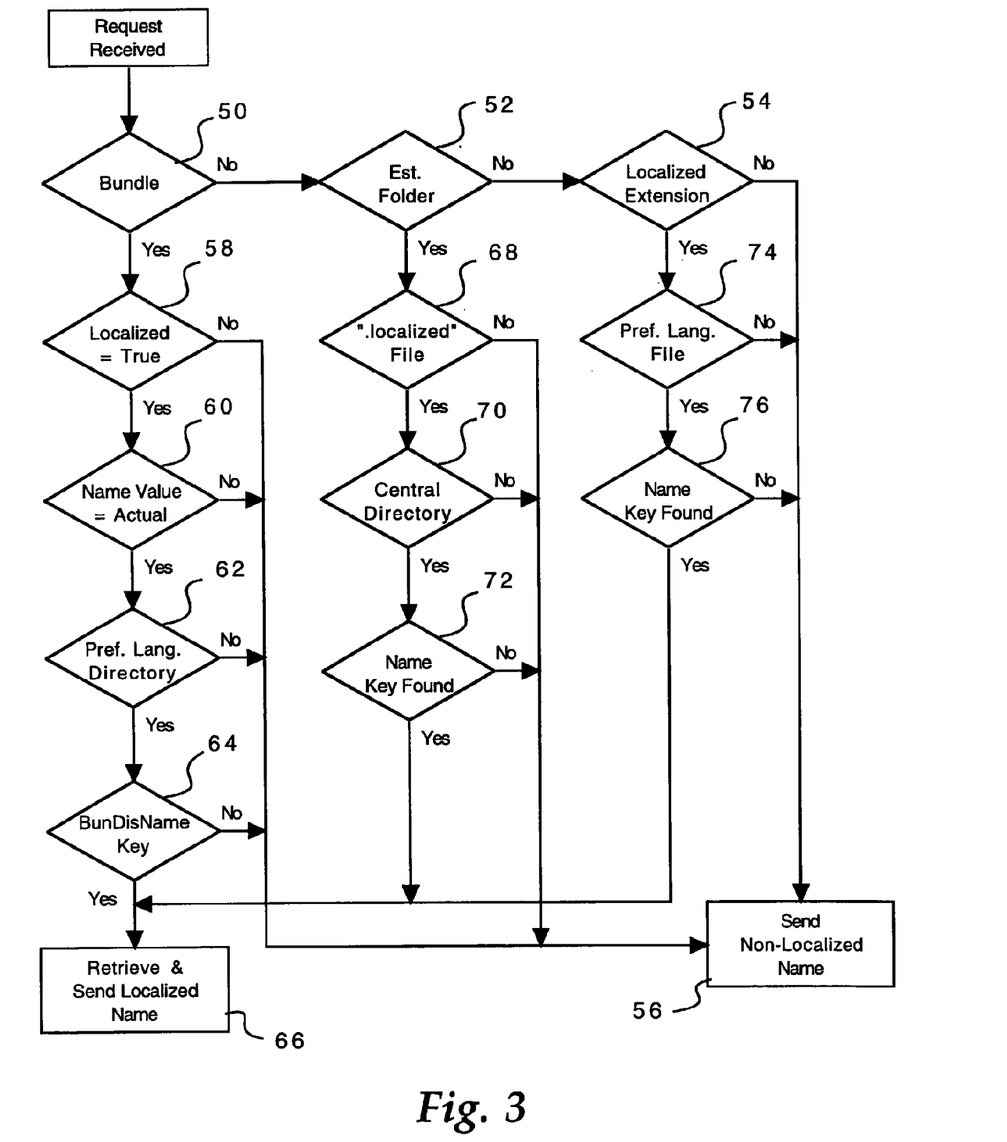
FIG. 3 is a flowchart illustrating the overall operation for displaying localized names.

FIG. 3 is a flowchart illustrating the operation for retrieving and displaying localized names for file system elements, in accordance with the foregoing description. When a request is received from an application or other executable code for information about file system elements, e.g. a listing of all elements in a particular directory, the APIs in the library examine each returned element to first determine its type. At step 50, a check is made to determine whether an element is a bundle, for example by checking its extension. If not, at step 52 a determination is made whether the element is one of the pre-established folders. If not, a determination is made at step 54 whether the element has a ".localized" extension. If the file system element does not meet any of these three criteria, then it is not localized and its default, or non-localized, name is sent to the requesting application at step 56.

If, at step 50, the element is determined to be a bundle, an API in the library 48 checks at step 58 whether the value for the "Localized" key in Info.plist is "True." If not, or if the key is not present, the non-localized name is sent at step 56. If the key is present and has a value of "True," a check is made at step 60 to determine whether the value for the key "BundleDisplayName" in the Info.plist is the same as the actual name of the bundle. If it is not, this provides an indication that the user has changed the name, and in this case the non-localized name designated by the user is sent, at step 56. If the actual name is the same as the key value, a determination is made at step 62 whether a localization directory for the user's preferred language is contained within the Resources directory for the bundle. If not, the non-localized name is sent at step 56. If the localization directory for the language of interest is found, a check is made at step 64 whether a key for the bundle display name is present in that directory, e.g. in an InfoPlist-.strings file. If so, the value for that key is retrieved from the file at step 66 and sent to the requesting application as the localized name for the file system element.

If the file system element is determined to be one of the pre-established folders at step 52, a determination is made at step 68 whether that folder contains a ".localized" file, indicating that it has localization information associated with it. If not, the non-localized name is sent to the requesting application at step 56. If a ".localized" file is found in the folder, a check is made at step 70 whether the central directory of localization information exists. If so, this directory is checked at step 72 to determine whether a key exists for the name of the folder, e.g. "System", within a file for the preferred language. If so, the value for that key is retrieved and sent as the localized name, at step 66.

If a ".localized" extension is detected on the file system element at step 54, a determination is made at step 74 whether that element has a localization file for the user's preferred language. If not, the non-localized name is sent at step 56. If the file exists, a determination is made at step 76 whether the file contains a name key that corresponds to the actual name of the element. If such a key is found, the value for that key is retrieved and sent as the localized name, at step 66. If there is no key that matches the name of the element, e.g. the user has changed its name, the non-localized actual name is sent at step 56.

From the foregoing, it can be seen that the present invention provides a mechanism by which a quick assessment can be made whether a file system element employs localization. Once the type of file system element has been determined, e.g. bundle, pre-established folder or arbitrary file/folder, the library 48 only needs to check one item of information associated with the element, at step 58, 68 or 54, to make this assessment. If localization is not employed, the non-localized name is quickly sent, in the normal manner. Thus, the number of file accesses are reduced when displaying multiple files and folders. If localization is employed, the APIs in the library access the appropriate resource associated with the user's preferred language to retrieve and send the localized name.

Figure 4:
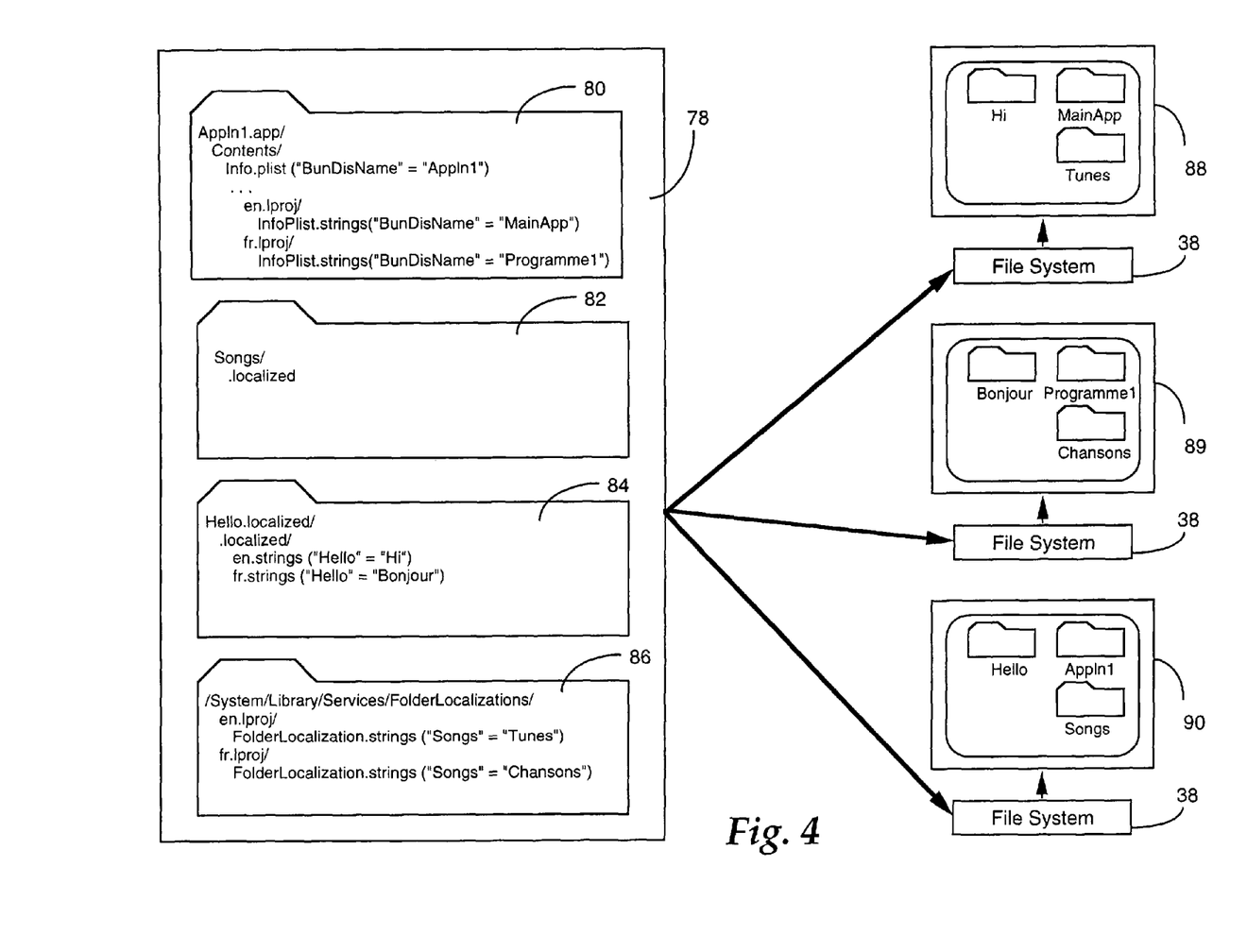
FIG. 4 is a schematic representation of localization results that can be achieved with the present invention.

As a particular advantage of the present invention, multiple users can view the same file system elements simultaneously, and each is presented with a localized name in that user's preferred language. Referring to FIG. 4, a shared storage device 78, such as a network drive, may contain, among other elements, an application bundle 80, a pre-defined folder 82 for audio files, and an arbitrary folder 84. Each of these elements has localized names for both the English and French languages. For the application bundle 80 and the arbitrary folder 84, the localized names are present within the contents of the element itself, as described previously. In the case of the pre-defined folder 82, the localized name is stored in a separate directory 86.

Different users can view the elements stored in the storage device 78 at their respective personal computers 88, 89 and 90. The user at computer 88 may have set her preferred language as English, whereas the user at computer 89 may have set his preferred language as French. The user at computer 90 may have designated a third language for which there is no localization of file system elements, e.g. Japanese. Based upon each of these settings, the file systems 38 of the respective personal computers, and more particularly the APIs associated with the file systems, identify and present the appropriate localized name for each element at the computers 88 and 89. In the case of computer 90, since there are no localized names in the Japanese language, the default names for the folders are displayed. These results are independent of the particular mechanism that is employed to access the folders, e.g. a browser, an "Open" command from an application, a utility such as a Search tool, etc.

As a further optional feature of the invention, the localization resources can be renamed to optimize search functions. More particularly, it is desirable to be able to locate files and folders based upon their localized names, as well as their default or actual names. If the search engine has to look inside each file or folder to find the localized name, e.g. "Bonjour", its performance could be slowed. To reduce such a possibility, and take advantage of the fast catalog search capability of many file systems, the localized name of a localized element is included as a filename for localized resources of the element. For example, in the case of a bundle, the InfoPlist-.strings files can be renamed, as follows:

---

Hello.app/
    Contents/
        Info.plist (contains "BundleDisplayName" = "Hello")
Resources/
    en.lproj/
        Hi.InfoPlist.strings (contains "BundleDisplayName" = "Hi")
    fr.lproj/
        Bonjour.InfoPlist.strings (contains "BundleDisplayName" = "Bonjour")
    For an arbitrary folder, the renaming produces the following result:
Hello.localized/
    .localized/
        Hi.en.strings (contains "Hello" = "Hi")
        Bonjour.fr.strings (contains "Hello" = "Bonjour")

---

Since the file system elements contain files whose names correspond to the localized names, they will be found quickly by the search engine. The search engine then only has to check whether a located file is associated with a localized file system element, and display the root folder or file for that element. Thus, even if the user only enters a partial filename in a search string, the search engine will be able to find all localized files whose names include that partial name.

The renaming of the files to accomplish this result can be carried out as part of a post-processing step during the production of any file system elements that are localized. For example, it can be achieved by extracting the localized string from a strings file and renaming the file. With this approach, the localization processes themselves do not require any modification.

In summary, it can be seen that the present invention enables the names of file system elements, including bundles, folders (or directories) and files, to be localized, so that users can view the elements with names in a preferred language of choice. Furthermore, since the methods for determining localization reside in the file system at the user's location, multiple simultaneous localizations of the same element in different respective languages are possible. The impact on performance is minimal, since it is possible to determine if a file system element has a localized name without the need to look inside the element. In addition, developers of applications and third-party products can also localize those products, for a consistent user experience.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method of displaying localized names for a file or folder stored in a computer system, the method comprising:
   receiving a selection of a preferred language;
   accessing the file or folder;
   determining whether the accessed file or folder has a localization indicator, which comprises a key-value pair, wherein the key is a non-localized name for the file or folder and its associated value is a localized name for a particular language and wherein the file or folder includes a plurality of localized attributes, with each attribute being associated with a different language;
   in response to determining that the localization indicator is present, searching the plurality of localized attributes of the file or folder for a localized attribute associated with the preferred language;
   retrieving information associated with the file or folder when a match for the localized attribute associated with the preferred language is found; and
   displaying a localized name of the file or folder based on the retrieved information, or displaying a non-localized name of the file or folder when the localized attribute associated with the preferred language is non-existent.

2. The method of claim 1 wherein the key value of each of said plurality of localized attributes comprises a key value that is stored with the contents of the file or folder.

3. The method of claim 2 wherein said key value is contained in a list of key-value pairs defining attributes of the file or folder.

4. The method of claim 2 wherein the file or folder comprises a bundle.

5. The method of claim 1 wherein the localized name is stored in a predetermined location separate from the file or folder.

6. The method of claim 1, further comprising:
   detecting whether the key matches an actual name of the file or folder stored in the file system; and
   displaying the localized name in response to detecting that there is a match.

7. The method of claim 1, wherein said key-value pair is stored in the contents of the file or folder.

8. The method of claim 7, wherein the contents of the file or folder include a plurality of key-value pairs that respectively correspond to different languages.

9. A processor encoded with a program for an operating system that, if executed by the processor, cause the processor to perform operations comprising:
   receiving a selection of a preferred language;
   receiving a request for access to at least one file or folder;
   accessing the at least one file or folder;
   determining whether the at least one file or folder has a localized attribute of the preferred language;
   determining whether the accessed file or folder has a localization indicator, which comprises a key-value pair, wherein the key is a non-localized name for the file or folder and its associated value is a localized name for a particular language with each of the plurality of localized attributes being associated with a different language;
   in response to determining that the accessed file or folder includes the localization indicator, searching the plurality of localized attributes associated with the preferred language;
   retrieving information associated with the file or folder when a match for the localized attribute associated with the preferred language is found, displaying a localized name of the file or folder; and
   displaying a non-localized name of the file or folder based on the retrieved information, or displaying a non-localized name of the file or folder when the localized attribute associated with the preferred language is non-existent.

10. The processor of claim 9 wherein said key value is contained in a list of key-value pairs defining localized attributes of the file or folder.

11. The processor of claim 9 wherein the file or folder comprises a bundle.

12. The file system of claim 9, the operations further comprising:
    detecting whether the key matches the actual name of the file or folder stored in the file system; and
    providing the localized name in response to detecting that there is a match.

13. The file system of claim 9 wherein localized names for a plurality of files and/or folders are stored in a location separate from the files and/or folders themselves.

14. A computer system, comprising:
    a storage device configured to store files and folders;
    a display device configured to display the names of said files and folders; and
    a processor encoded with a program for an operating system that, if executed by the processor, cause the processor to perform operations comprising:
    receiving a selection of a preferred language;
    receiving a request for access to at least one file or folder;
    accessing the at least one file or folder;
    determining whether the at least one file or folder has a localized attribute of the preferred language;
    determining whether the accessed file or folder has a localization indicator, which comprises a key-value pair, wherein the key is a non-localized name for the file or folder and its associated value is a localized name for a particular language;
    in response to determining that the accessed file or folder includes the localization indicator, searching the plurality of the localized attributes associated with the preferred language;
    retrieving information associated with the file or folder when a match for the localized attribute associated with the preferred language is found, displaying a localized name of the file or folder; and
    sending a non-localized name of the file or folder to said display device based on the retrieved information, or sending a localized name of the file or folder when the localized attribute associated with the preferred language is non-existent.

15. A computer having a processor encoded with a program for an operating system, wherein when the processor executes the program the operating system includes a file system that includes at least one file or folder of a system file or folder of the operating system, the computer comprising:
  means for receiving a selection of a preferred language;
  means of determining whether the at least one file or folder includes a first attribute that indicates that the element is localized, wherein the first attribute comprises a key-value pair wherein the key is a non-localized name for the file or folder and its associated value is a localized name for a particular language;
  means searching among a plurality of localized names of the at least one file or folder for a localized name associated with the preferred language when the at least one file or folder is determined to be localized;
    wherein each localized name is associated with a different language;
  means for retrieving and returning the localized name of the preferred language, as the name of said file or folder, when a match is found; and
  means for returning a non-localized name, as the name of said file or folder, when the at least one file or folder does not include the first attribute of the preferred language.

16. The file system of claim 15 wherein the key value of each attribute is stored with the contents of the file or folder.

17. The file system of claim 15 wherein the localized name is stored in a predetermined location separate from the file or folder.

18. A non-transitory computer-readable medium containing a program, which when executed by a computer, causes the computer to perform operations comprising:
  receiving a selection of a preferred language;
  receiving a request to access a file or folder;
  determining whether the requested file or folder includes a first attribute, which indicates that the requested file or folder is localized, wherein the first attribute comprises a key-value pair, wherein the key is a non-localized name for the file or folder and its associated value is a localized name for a particular language;
  in response to determining that the requested file or folder is localized, searching the plurality of localized attributes associated with the preferred language by searching among a plurality of localized names of the at least one requested file or folder for a localized name of the preferred language, where each localized name is associated with a different language;
  retrieving and returning the localized name for the preferred language as the name of said file or folder if a match is found; and
  returning a non-localized name, which corresponds to a second attribute of the plurality of localized attributes, as the name of said file or folder, if a match for the localized name of the preferred language is not found.

19. The computer-readable medium of claim 18 wherein the key value of each attribute is included in the contents of the file or folder.

20. The computer-readable medium of claim 19 wherein said key value is contained in a list of key-value pairs defining attributes of the file or folder.

21. The computer-readable medium of claim 20 wherein the file or folder comprises a bundle.

22. The computer-readable medium of claim 18, wherein the contents of the file or folder include a plurality of key-value pairs that respectively correspond to different languages.

23. A method of displaying names in a computer system, the method comprising:
  receiving a selection of a preferred language;
  providing a file system configured to manage access to information stored in one or more storage devices that are operatively coupled to the computer system, the file system including at least: (1) one or more files, (2) one or more folders, or (3) one or more directories, as elements of the file system;
  associating the elements of the file system with the information stored in the one or more storage devices, wherein the information comprises a plurality of localized attributes associated with the elements, wherein the plurality of localized attributes are stored as a key-value pair, where the key is a non-localized name for the respective one or ones of the file system elements and its associated value is a localized name for a particular language, with each attribute being associated with a different language;
  accessing a respective element of the file system to obtain at least one of the plurality of localized attributes associated with the preferred language stored in the one or more storage devices, a respective one or ones of the file system elements having a non-localized name and at least one localized name as stored names, each localized name corresponding to a respective different language,
  selecting a respective stored name associated with the accessed file system element based on the preferred language; and
  displaying the selected stored name of the accessed file system element, as the displayed name of the accessed file system element.

24. The method of claim 23, wherein the selecting of the respective stored name associated with the accessed file system element based on the preferred language includes:
  associating a filename with the non-localized name of a specified file system element;
  including in the filename associated with the non-localized name of the specified file the localized name of the specified file system element; and
  searching, based on the association of the filename with the non-localized name, in the filename for the localized name.

25. The method of claim 24, wherein the searching in the filename for the localized name includes:
  receiving a partial filename; and
  finding each of the localized filenames that include the partial filename.

26. A method of displaying names of files, folders or directories in a file system of a computer system configured to manage access to information stored in one or more storage devices operatively coupled to the computer system, the method comprising:
  receiving a selection of a preferred language;
  accessing a file, folder or directory of the file system to obtain associated information stored in the one or more storage devices;
  determining whether the accessed file, folder or directory has a localization indicator, wherein the localization indicator is stored as a key-value pair, where the key is a non-localized name for the accessed file, folder or directory and its associated value is a localized name for a particular language, and wherein the localization indicator indicates that the accessed file, folder or directory has at least two names stored with it, one of which is a non-localized name and each remaining name being a localized name respectively associated with a different language;

if the accessed file, folder or directory has a localization indicator, selecting the stored localized name of the accessed file, folder or directory that is associated with the preferred language;

if the accessed file, folder or directory does not have a localization indicator, or does not have a stored localized name associated with the preferred language, selecting the non-localized name; and displaying the selected stored name of the accessed file, folder or directory.

* * * * *

UNITED STATES PATENT AND TRADEMARK OFFICE
CERTIFICATE OF CORRECTION

PATENT NO. : 8,244,712 B2  
APPLICATION NO. : 10/389743  
DATED : August 14, 2012  
INVENTOR(S) : Serlet et al.

It is certified that error appears in the above-identified patent and that said Letters Patent is hereby corrected as shown below:

Claim 15, column 13, line 13, between the words "means" and "searching", please insert --for--.

Signed and Sealed this
Twentieth Day of November, 2012

David J. Kappos
*Director of the United States Patent and Trademark Office*